Sept. 12, 1944.　　　E. A. LINK ET AL　　　2,358,016
AVIATION TRAINER
Filed Sept. 9, 1942　　　3 Sheets-Sheet 3

EDWIN A. LINK
KARL A. KAIL
*INVENTOR.*

BY Donald T. Hillier
ATTORNEY

Patented Sept. 12, 1944

2,358,016

UNITED STATES PATENT OFFICE 2,358,016

AVIATION TRAINER

Edwin A. Link, Binghamton, N. Y., and Karl A. Kail, Montrose, Pa., assignors to Link Aviation Devices, Inc., Binghamton, N. Y., a corporation of New York Application September 9, 1942, Serial No. 457,692

33 Claims. (Cl. 35—12)

This invention relates to grounded aviation trainers and is especially adapted for use in connection with aviation trainers of the type disclosed in U. S. Patents 1,825,462 and 2,099,857.

The aforementioned U. S. patents describe a trainer having a fuselage mounted upon a universal joint for banking and pitching in simulation of the banking and pitching of an airplane in actual flight and also describe means for rotating the fuselage about its vertical axis in simulation of the turning of a real plane. These movements of the trainer fuselage are under the control of the student in the trainer who may control the movements of the fuselage by a manipulation of the stick (or control column) and rudder pedals in the same manner that a pilot in actual flight controls the movements of a plane.

One of the principal objects of the present invention is to provide in such a trainer means whereby many additional responses of an airplane in flight to a movement of the control column and rudder pedals may be simulated in a trainer having a fuselage capable of pitching and banking as well as turning about its vertical axis.

Another object of our invention is the provision of novel means whereby the trainer fuselage will be made to bank automatically whenever it is turned about its vertical axis.

Another important object of our invention is the provision of means responsive to the banking position of the fuselage and of the control column whereby the fuselage may be made to turn whenever it is banked and the control column is held behind its neutral position.

Another object of the instant invention is the provision of means whereby the fuselage will automatically turn when it is banked in combination with means for accelerating the turning thereof whenever the control column is behind its neutral position.

A further object of the instant invention is the provision of means in a trainer in which the fuselage will automatically nose down and bank whenever it is turned about its vertical axis, whereby the turning about the vertical axis will be accelerated whenever the control column is held back by the student in order to overcome the nosing down of the fuselage.

A still further important purpose of this invention is to provide in combination with primary means for banking the fuselage, additional means whereby the banking of the fuselage as a result of movement of the primary means causes a further banking of the fuselage.

Another object of the invention is to provide in an aviation trainer which automatically turns whenever the fuselage is banked additional means whereby the turning of the fuselage occurring simultaneously with the banking thereof is further accelerated by the banking of the fuselage.

It is an additional stated object of our invention to simplify the valve construction in grounded aviation trainers which employ fluid means to cause the fuselage of the trainer to move about its axes.

Other objects and advantages will become apparent as the description proceeds, reference now being made to the accompanying drawings wherein a preferred embodiment of this invention is shown. In the drawings, in which like reference numerals indicate like parts.

Figure 1:
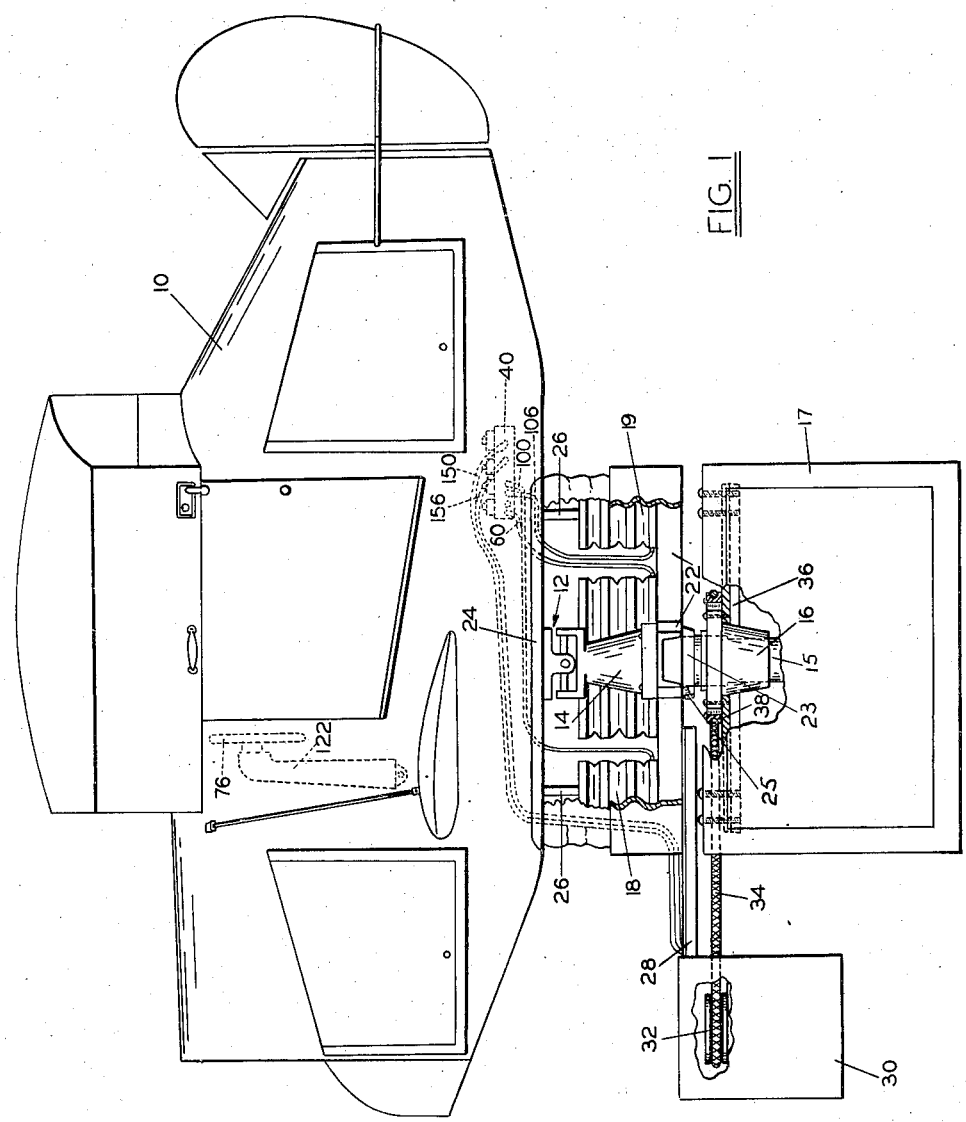
Fig. 1 is a side view of an aviation trainer of the type mentioned above.

Referring to Fig. 1, it will be seen that such a trainer comprises a fuselage 10 mounted upon a universal joint designated generally as 12 which in turn rests upon a central supporting member 14.

Figures 3, 4:
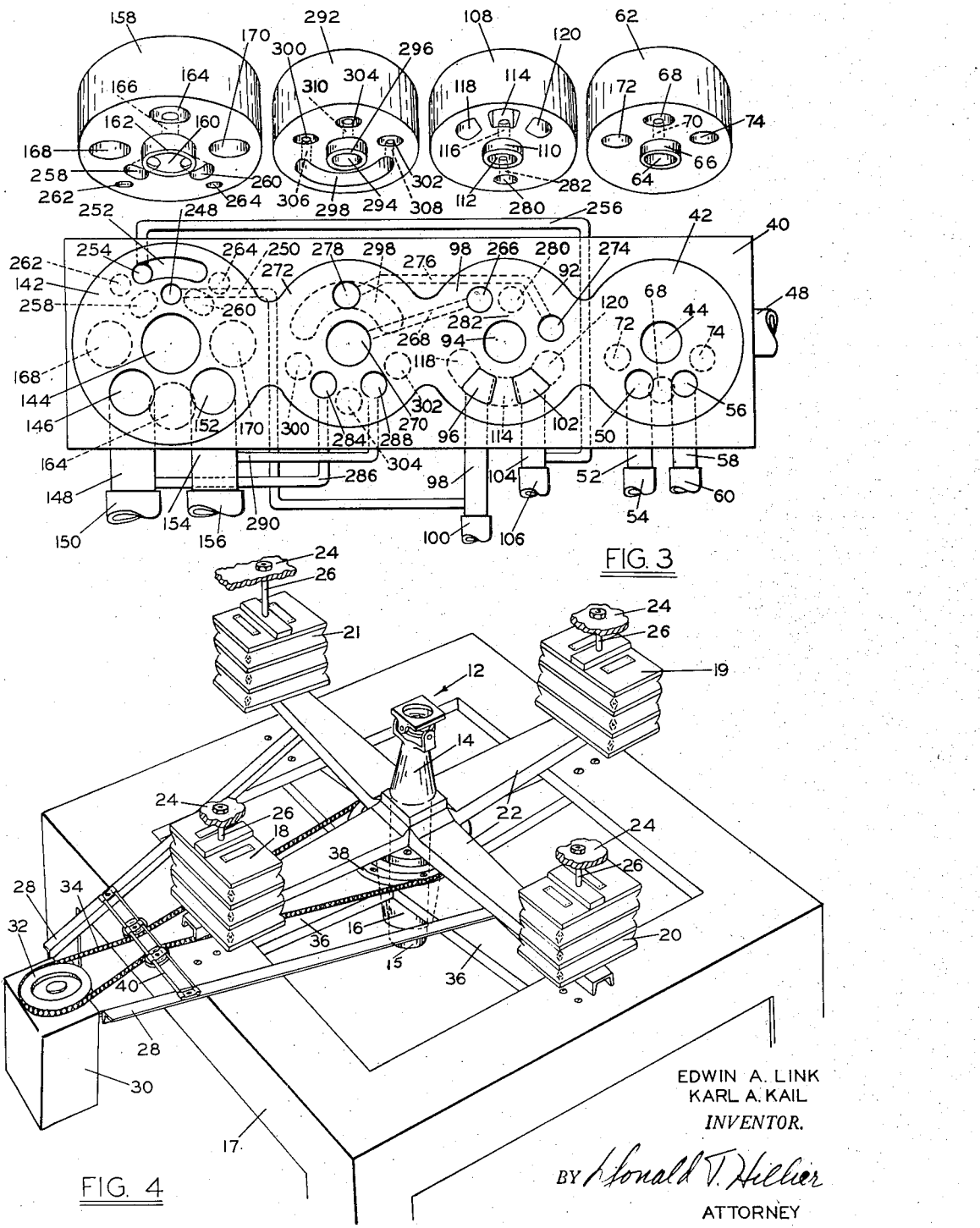
Fig. 3 is a detailed view of the valves and certain of the associated parts of the invention.
Fig. 4 is another perspective view of certain parts of the trainer.

In Fig. 1, it will be seen that central supporting member 14 extends downwardly and is affixed to cross pieces 22. Integral with cross pieces 22 is a boss 23 and shaft 15 which is rotatably mounted within the receiving member 16 and has its upper end mounted in boss 23 and affixed thereto by means of screw 25. As seen in Figs. 1 and 4, two pairs of bellows are provided, the bellows 18 and 19 being fore and aft of the trainer fuselage and designated as the front and rear elevator bellows respectively, while the bellows 20 and 21, one of which is under either side of the trainer fuselage, are referred to as the left and right aileron bellows respectively. All four of these bellows are identical in construction, each having an upper and lower side and made almost air tight by means of suitable covering material. The bottom of each of these bellows is mounted upon one of the cross arms 22 and the upper portion of each of these four bellows is connected to the bottom 24 of the trainer fuselage 10 by means of bolts 26. It will therefore be realized that if bellows 20 be contracted and at the same time bellows 21 be expanded, the trainer fuselage 10 will be tipped toward the left, universal joint 12 continuing to support the fuselage by accommodating itself to this movement. An expansion of bellows 20 and a simultaneous contraction of bellows 21 will cause the fuselage 10 to bank to the right.

In the same manner, a contraction of bellows 18 and an accompanying expansion of bellows 19 will cause the front end of fuselage 10 to become lower in simulation of the diving of a plane in actual flight. If bellows 19 be contracted and at the same time bellows 18 be expanded, the fuselage 10 will assume a climbing attitude.

The cross arms 22 are rigidly affixed to central support 14, and, therefore, whenever that support rotates within receiving member 16 it will be realized that the cross arms 22, bellows 18, 19, 20 and 21, universal joint 12 and trainer fuselage 10 rotate therewith. This rotation of the fuselage about its vertical axis is in simulation of the turning of a plane in actual flight.

Still referring to Fig. 4, it will be seen that a pair of extending arms 28 are rigidly affixed to the transverse cross arm 22 upon which aileron bellows 20 and 21 are mounted. These arms therefore extend longitudinally of the trainer fuselage and upon their forwardmost end is mounted a turning motor 30. This motor is of such a nature that when vacuum is admitted to one side and atmosphere to the other the output shaft turns in one direction, while if the vacuum and atmosphere be reversed the output shaft of the motor turns in the opposite direction. The output shaft of this motor has mounted thereupon at its uppermost end a wheel 32 adapted to receive endless belt 34. Within base 17 and in a plane a substantial distance from the top thereof, as seen in Figs. 1 and 4, there are rigidly mounted two other cross pieces 36. Rigidly mounted upon the top of these cross pieces 36 is a wheel 38 which is also adapted for the reception of endless belt 34. A suitable belt tightener 40 is provided.

Bearing in mind the fact that the base 17, cross arms 36 and wheel 38 are at all times stationary and that turning motor 30 is held by extending arms 28 which are rigidly affixed to cross piece 22 which in turn is rigidly affixed to rotatable member 14, it will be realized that a turning of wheel 32 in a clockwise direction as viewed from above will have a tendency to move endless belt 34 in the same direction, but the friction between belt 34 and fixed wheel 38 will prevent such a turning of this belt. At the same time, the friction between wheel 32 and the belt is too great to permit slipping between these two elements, and consequently wheel 32 travels along the belt in a counterclockwise direction as far as the belt is concerned. The result is that the clockwise turning of wheel 32 will move turning motor 30, extending arms 28, cross pieces 22, central support 14, universal joint 12, bellows 18, 19, 20, and 21, and trainer fuselage 10 in a counterclockwise direction. A movement of wheel 32 in the other direction will of course move these same parts in a clockwise direction.

Banking of trainer fuselage

Reference is now made to Figs. 1, 2, 3, and 4 which disclose in detail the means employed in my invention for actuating the bellows 18, 19, 20, and 21 and the wheel 32 of turning motor 30.

In Fig. 3 is shown a casting 40 a part of which comprises the lower part 42 of the aileron valve. The lower part of this valve has a central port 44 in which is present at all times reduced air pressure which has as its source a turbine (not shown) which is in communication with the port 44 by means of connection 48. Also in the lower part of the aileron valve is the port 50 which extends a substantial distance within the lower half and then turns to communicate with its exterior outlet 52 which in turn is in communication with the left aileron bellows 20 by means of connection 54. A third port 56 which is companion to port 50 is likewise in the lower half 42 of the aileron valve and is in communication with its exterior outlet 58 which in turn is in communication with right aileron bellows 21 by means of tube 60.

The upper leaf of the two-leaf aileron valve as seen in Fig. 3 is designated by the number 62. It will be seen that this half comprises a port 64 which has a stem 66. Stem 66 fits closely into port 44 of the lower half 42 so that port 64 is at all times in engagement with vacuum port 44 and so that the upper portion 62 may at all times rotate with respect to the lower portion 42 of this valve. Port 64 is in communication with port 68 by means of interior duct 70. Inasmuch as ports 64 and 68 do not extend completely through upper half 62 it will be realized that vacuum which at all times is present in port 44 of the lower half of this valve likewise at all times will enter port 64 and by means of duct 70 will at all times be present in port 68 which is in contact at all times with the upper face of the lower half 42 of the aileron valve.

Also in the upper half 62 of the aileron valve are provided two ports 72 and 74 which extend completely through the upper half. This being the case, atmosphere will at all times be present in ports 72 and 74, the lower openings of which are also in contact with the upper face of the lower half 42.

When upper valve section 62 is mounted in the neutral position in relation to lower section 42, as seen in Fig. 3 wherein the positions of the ports of the upper section are shown in dotted outline, port 68 lies between ports 50 and 56 and slightly overlaps each of them. Because of this arrangement, the vacuum present in port 68 will be applied equally and to a limited extent to the connections 54 and 60 which communicate with the left and right aileron bellows respectively. These bellows will therefore be collapsed equally and the trainer fuselage will be maintained laterally level. When in the neutral position, atmospheric ports 72 and 74 are in contact with the upper face of lower half 42 as shown, i. e., adjacent the ports 50 and 56 respectively and, consequently, no atmosphere enters the bellows 20 and 21.

Figure 2:
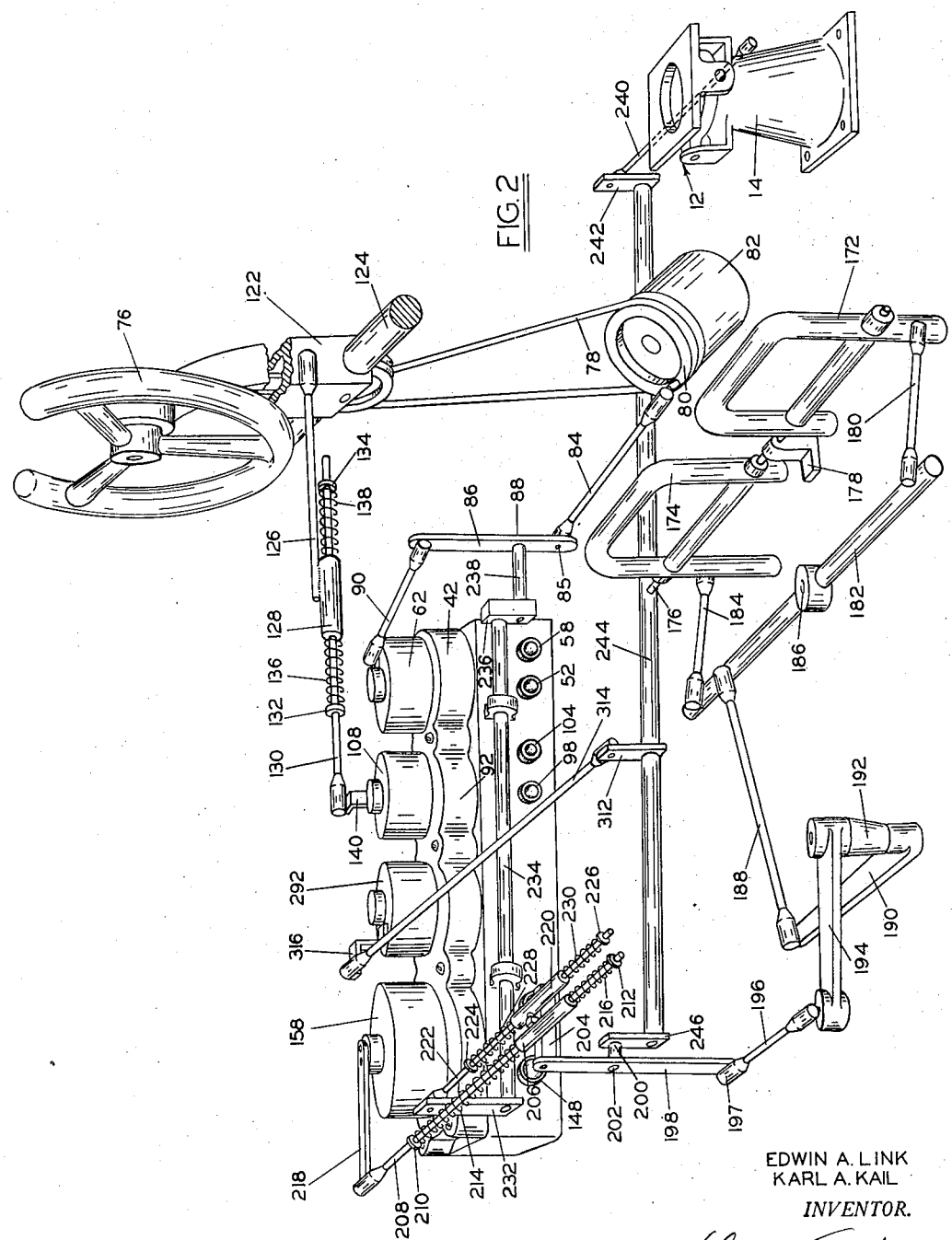
Fig. 2 is a diagrammatic illustration of the principal parts of this invention.

Referring to Fig. 2, whenever the control wheel 76 is turned toward the left, i. e., counterclockwise as viewed by the student in the trainer, by means of a sprocket arrangement or its equivalent (not shown) the cable 78 through a conventional reversing means causes wheel 80 which is rotatably mounted upon casing 82 to turn clockwise as viewed in Fig. 2 and link 84 which is pivotally connected to wheel 80 will move toward the left side of the trainer. The lower end of lever 86 will move in the same direction, in this instance lever 86 pivoting about the point 88, and the upper end of lever 86 will therefore move toward the right side of the trainer as will link 90 which is pivotally connected to the upper end thereof. Inasmuch as this last link is also pivotally connected to the upper surface of the upper aileron valve section 62, upper valve section 62 will turn clockwise as viewed from above.

Referring now to Fig. 3, it will be seen that such a turning of upper valve section 62 will cause vacuum port 68 to become out of communication with port 56 and in greater communication with port 50. Consequently, more vacuum will be applied to this latter port and through exterior outlet 52 and connection 54 a greater amount of vacuum will be applied to left aileron bellows 20. At the same time, atmospheric port 74 will come into communication with port 56 and atmosphere will therefore be applied through exterior outlet 58 and communication 60 to aileron bellows 21. Aileron bellows 20 will contract while aileron bellows 21 will expand, and therefore, the trainer will be made to bank to the left in consequence of a turning of the control wheel 76 to the left.

A moment's reflection will make it clear that a turning of control wheel 76 toward the right, i. e., clockwise, will cause cable 78 to turn rotatable wheel 80 counterclockwise thereby pulling link 84 and the lower end of lever 86 to the right, thus causing the upper end of this last-mentioned lever and link 90 to move toward the left, thus rotating upper valve section 62 counterclockwise as viewed from above. Vacuum port 68 will communicate with port 56 and a greater amount of reduced air pressure will therefore be applied to aileron bellows 21 while atmospheric port 72 will communicate with port 50 and atmosphere will be applied to aileron bellows 20. The resultant expansion of the latter bellows and contraction of the former will cause the trainer to bank to the right.

It will be realized therefore that a clockwise rotation of upper valve section 62 will cause the trainer to bank toward the left and that a rotation in the opposite direction will cause the trainer to bank toward the right. Furthermore, a turning of control wheel 76 in either direction causes upper rotatable valve section 62 to rotate in the correct direction in order that the trainer will bank in response to a given movement of control wheel 76 in the same manner that a real airplane would bank in response to a similar movement of the control wheel therein.

*Climbing and diving of trainer fuselage*

Referring to Fig. 3, the number 92 designates the lower half of the elevator valve. The central port 94 of this valve is at all times filled with reduced air pressure in the same manner as is central port 44 of the aileron valve. Port 96 of lower valve section 92 communicates with its exterior outlet 98 which is in communication with front elevator bellows 18 by means of connection 100. Port 102 of lower section 92 communicates with its exterior outlet 104 which in turn is in communication with rear elevator bellows 19 by means of tube 106.

The upper rotatable section of the elevator valve is designated in Fig. 3 by the number 108. This valve has a central stem 110 which fits exactly into port 94 and which permits relative rotation between the lower and upper valve sections 92 and 108. Central port 112, being at all times in communication with central port 94, is therefore at all times filled with vacuum. Inasmuch as port 114 is in communication with port 112 by means of interior duct 116, port 114 likewise at all times will have present therein reduced air pressure. Port 114 like port 112 does not extend completely through upper rotatable valve section 108 but atmospheric ports 118 and 120 do extend completely through the upper section of the elevator valve.

The lower outlets of ports 114, 118 and 120 are in contact with the upper face of lower elevator valve section 92 and whenever upper valve section 108 is in its neutral position with relation to lower valve section 92, it will be seen in Fig. 3 that port 114 lies between ports 96 and 102 and slightly overlaps each of them while atmospheric ports 118 and 120 are positioned adjacent ports 96 and 102 as shown. Such being the case, a small and equal amount of vacuum will be applied to each of the ports 96 and 102 and therefore to each of the connections 100 and 106 and the elevator bellows 18 and 19. Each of these two bellows will therefore be collapsed to the same extent and the trainer fuselage will be positioned longitudinally level in simulation of the level flight of a real plane.

A turning of upper rotatable valve section 108 clockwise as viewed from above will cause vacuum port 114 to become out of communication with port 102 and into greater communication with port 96, and an increased amount of vacuum will be applied through connection 100 to the front elevator bellows 18. At the same time, atmospheric port 120 will come into communication with port 102 and atmosphere will be applied through connection 106 to rear elevator bellows 19. The increased vacuum applied to front elevator bellows 18 will cause a contraction thereof while the increased atmosphere applied to rear elevator bellows 19 will cause an expansion thereof and the trainer will be made to pitch in simulation of the diving of a plane in actual flight.

On the other hand, a turning of upper rotatable valve section 108 in a counterclockwise direction will cause vacuum port 114 to communicate to a greater extent with port 102 and consequently more vacuum will be applied to rear elevator bellows 19. At the same time, atmospheric port 118 will be brought into communication with port 96 and atmosphere will be applied to front elevator bellows 18. The resultant expansion of the front elevator bellows and contraction of the rear elevator bellows will cause the trainer to pitch in simulation of the climbing of a plane in actual flight.

Referring now to Fig. 2, it will be seen that the wheel 76 is mounted at the top of control column 122. The lower end of control column 122 is mounted upon horizontal shaft 124 and this shaft in turn is pivotally mounted upon any suitable part of the bottom of the trainer fuselage. Pivotally connected to control column 122 at a point above horizontal shaft 124 is the link 126, to the other end of which is pivotally connected housing 128. This housing is slidably mounted upon another link 130 and upon this latter link are positioned as shown a pair of stops 132 and 134. Between each of these stops and one end of the housing 128 is a compensating spring 136 or 138 which allows overtravel of the wheel 76 and link 126 with respect to the turning of valve leaf 108. The end of link 130 toward the rear of the trainer fuselage is pivotally connected to a bracket 140 which in turn is rigidly affixed to upper rotatable valve section 108. It will be readily seen that when the student in the trainer pulls control wheel 76 toward him link 130 will move to the rear and the upper rotatable valve section 108 will be made to turn counterclockwise as viewed from above. As explained above, such a movement will apply atmosphere to front elevator bellows 18 and vacuum to rear elevator bellows 19 and the trainer fuselage will assume a climbing position.

On the other hand, when the student in the trainer pushes control wheel 76 away from him, valve section 108 will turn clockwise, atmosphere will be applied to rear elevator bellows 19 and vacuum to front elevator bellows 18 and the trainer fuselage will assume a diving attitude.

It may be concluded therefore that whenever the student in the trainer pushes the control wheel 76 away from him the trainer fuselage will assume a diving position while an opposite movement of the control wheel will cause the trainer fuselage to assume a climbing position in exact simulation of the response of a real plane in flight to corresponding control column movements.

Turning action

Referring to Fig. 3, the number 142 designates the lower section of the rudder valve. This section has a central port 144 which is at all times vacuum-filled by the same means as the central ports of the aileron and elevator valves. Port 146 communicates with its exterior outlet 148 which in turn is in communication with the left side of turning motor 30 by means of connection 150. Port 152 communicates with its outlet 154 which in turn communicates with the right side of turning motor 30 by means of connection 156. The upper rotatable section of the rudder valve is designated by the numeral 158 and this section has a central port 160 surrounded by a stem 162 which fits within port 144. Port 164 is in communication with port 160 by means of interior duct 166 and therefore there is present in port 164 at all times reduced air pressure. Ports 160 and 164 do not extend completely through upper rotatable valve section 158 but atmospheric ports 168 and 170 do extend completely through upper rotatable valve section.

When the upper section 158 of this valve is in its neutral position with respect to the lower section 142 of the rudder valve, port 164 lies between and slightly overlaps each of the ports 146 and 152. A small amount of vacuum will therefore be applied through connections 150 and 156 to each side of the turning motor and no rotation of the fuselage will result. Ports 168 and 170 will, when upper rotatable section 158 is centralized, be positioned with respect to the ports in the lower section 142 as shown in the Fig. 3.

However, in the event that upper valve section 158 be rotated in a clockwise direction as viewed from above, vacuum port 164 will become out of communication with port 152 and into greater communication with port 146 and a greater amount of vacuum will be applied to the left side of turning motor 30. At the same time, port 170 will be brought into communication with port 152 and atmosphere will be applied to the right side of turning motor 30. The application of vacuum to the left side and atmosphere to the right side of the turning motor will cause wheel 32 to turn in a clockwise direction and the trainer fuselage will, as explained above, be made to turn toward the left.

On the other hand, a rotation of upper rudder valve leaf 158 in a counterclockwise direction will position vacuum port 164 in greater contact with port 152 and an increased amount of vacuum will be applied to the right side of turning motor 30. Simultaneously therewith, port 168 will register in contact with port 146 and atmosphere will be applied to the left side of turning motor 30, the result being a turning in a counterclockwise direction of wheel 32 and a turning to the right of the trainer fuselage 10.

Referring now to Fig. 2, it will be seen that a pair of rudder pedals 172 and 174 are provided. Each of these pedals is rotatably mounted upon horizontal shaft 176 which in turn is held by brackets 178, only one of which is shown. To the lower extension of rudder pedal 172 is pivotally connected a link 180, the other end of which is likewise connected to the right end of rudder bar 182. Likewise, to the lower extension of rudder pedal 174 is pivotally connected link 184, the other end of which is pivotally connected to the left end of rudder bar 182. This rudder bar is pivotally mounted at the point 186.

Pivotally connected to the left end of rudder bar 182 is a link 188 and the rear end of this link is likewise connected to the lower arm 190 of bell crank designated by 192. Also pivotally connected to the rear end of the upper arm 194 of bell crank 192 and extending transversely of the trainer fuselage is link 196. The left end of this link is pivotally connected to the lower end of lever 198, which lever is pivotally mounted upon stub shaft 200 at the point 202. Rigidly affixed to the upper end of lever 198 is extension 204 and rigidly connected thereto is sleeve 206. Link 208 slides within sleeve 206 and upon this link are two stops 210 and 212, there being between stop 210 and the left end of sleeve 206 a compensating spring 214 and between stop 212 and the other end of sleeve 206 another compensating spring 216. These springs allow overtravel of arm 204 with respect to the turning of upper valve leaf 158. The left end of link 208 is pivotally connected to one end of horizontal arm 218 the other end of which is rigidly affixed to upper rotatable valve section 158.

When the student in the trainer applies his foot to left rudder pedal 174, link 184, the left end of rudder bar 182, link 188, and the end of arm 190 to which the latter link is connected will be made to move toward the rear of the trainer fuselage. Through the action of bell crank 192 the end of arm 194 to which link 196 is connected will be made to move toward the right of the trainer fuselage as will link 196 and the lower end of lever 198. The upper end of lever 198 will be forced to the left of the trainer fuselage, (in this instance this lever pivoting about the point 202), as will link 208 and the end of arm 218 to which it is connected. Upper rotatable section 158 of the rudder valve will therefore be turned clockwise, and as explained in detail above, vacuum will be admitted to the left side of turning motor 32, atmosphere to the right side of this turning motor, and the trainer fuselage will be made to turn toward the left.

Similarly, when the student in the trainer applies his foot to right pedal 172, link 180 and the right end of rudder bar 182 will be forced to the rear of the fuselage, the left end of the rudder bar will be moved forward as will link 188 and the end of arm 190 to which it is connected. Link 196, through the action of bell crank 192, will be moved toward the left and the upper end of lever 198 will be forced to the right as will link 208 and the end of arm 218 to which it is pivotally connected. Upper rotatable valve section 158 will therefore be moved counterclockwise, vacuum will be admitted to the right side of turning motor 30 and atmosphere will be admitted to the left side and the trainer fuselage will be turned toward the right.

It may be concluded, therefore, that with the foregoing described means the trainer fuselage will be turned toward the left by the student's pressing his left foot on left rudder pedal 174 and that the trainer fuselage may be turned toward the right by a pushing forward of right rudder pedal 172 in exact simulation of the response of a real plane in actual flight to corresponding rudder pedal movements.

Automatic banking of the trainer fuselage with a turning thereof

A plane in actual flight will automatically bank to a certain extent without the aid of the ailerons whenever the plane is turned by applying pressure to either of the rudder pedals. The following means are embodied in this invention in order that the trainer will bank in response to rudder pedal movement.

In the above description of the functioning of the rudder valve, it was shown that whenever the student in the trainer applies his foot to left rudder pedal 174, the upper end of lever 198 moves toward the left side of the trainer fuselage carrying with it horizontal arm 204 which is rigidly affixed to its upper end. As seen in Fig. 2, sleeve 220 is rigidly affixed to arm 204 in the same manner as sleeve 206. Link 222 is slidably mounted within sleeve 220 and upon this link are two stops 224 and 226. Between stop 224 and sleeve 220 is a compensating spring 228 and a compensating spring 230 is between the other end of sleeve 220 and stop 226. These springs allow overtravel of arm 204 with respect to the movements of the upper end of arm 232. The left end of link 222 is pivotally connected to upstanding arm 232, the lower end of which is rigidly affixed to longitudinal shaft 234. Likewise affixed to the other end of this shaft is block 236. Integral with the lower end of this block is a stub shaft 238 upon which is pivotally mounted at the previously-mentioned point 88 lever 86. As previously explained, to the upper end of lever 86 is pivotally connected link 90, a movement of which will cause a rotation of the upper half 62 of the aileron valve.

It will therefore be realized that a pressing forward of rudder pedal 174 will cause the upper end of lever 198, arm 204, link 222 and the upper end of arm 232 to move toward the left side of the trainer fuselage. Longitudinal shaft 234 will therefore be turned counterclockwise as viewed from the rear of the trainer fuselage and the lower end of block 236 and stub shaft 238 will be moved toward the right side of the trainer fuselage. In this instance, lever 86 pivots at the point 85 and therefore the upper end of lever 86 and link 90 will also be moved toward the right. A clockwise rotation of the upper rotatable half 62 of the aileron valve will result, and as explained in detail above, increased vacuum will be applied to left aileron bellows 20 and atmosphere will be applied to right aileron bellows 21. The trainer fuselage will bank toward the left which, it will be recalled, is in the same direction as the turn.

It will be readily appreciated that when the student in the trainer applies his foot to right rudder pedal 172 opposite movements of the immediately aforedescribed parts will result, upper rotatable section 62 of the aileron valve will be moved counterclockwise, an increased amount of vacuum will be applied to right aileron bellows 21 and atmosphere will be applied to left aileron bellows 20, and a banking of the trainer toward the right will result, again in the same direction as the turn.

The farther the rudder pedal 172 or 174 is pushed the greater will be the rotation of the upper half 62 of the aileron valve, and, therefore, the bank caused by turning of the trainer is proportional to the rate of turn. This banking may be overcome, as in a real plane, by the application of opposite rudder and/or opposite aileron.

With the aforedescribed means, therefore, a pressing forward of left rudder pedal 174 will simultaneously cause a turning and a banking of the fuselage 10 toward the left and a similar movement of right rudder pedal 172 will cause a simultaneous turning and banking of the fuselage toward the right, in exact simulation of the response of an airplane in actual flight to corresponding rudder pedal movements.

Automatic turning of the trainer fuselage with a banking thereof

Referring again to the response of a plane in actual flight for purposes of comparison, whenever a ship is banked the plane will always turn to a certain extent in the direction of the bank even though no movement of the rudder pedals be made by the pilot. The following discloses means for simulating in the trainer this response of a plane in flight.

Referring to Fig. 2, it will be seen that a link 240 is pivotally connected to central support 14 at a point below universal joint 12. The other end of link 240 is pivotally connected to the upper end of arm 242, the lower end of which is rigidly connected to longitudinal shaft 244. The other end of shaft 244 has rigidly affixed thereto an upstanding member 246 which has formed integrally therewith the stub shaft 200 to which reference has been previously made. As has been also described, lever 198 is pivotally mounted upon stub shaft 200 at the point 202 and a movement of the upper end of lever 198 causes a movement of link 208 which in turn will cause a rotation of the upper half 158 of the rudder valve.

Inasmuch as longitudinal shaft 244 is mounted in the bottom of the trainer fuselage the position of which varies as the fuselage is banked while the right end of link 240 is affixed to central support 14 at a point below universal joint 12, it will be appreciated that a banking of the trainer fuselage toward the left will cause the upper end of arm 242 to move to the left, shaft 244 will turn counterclockwise as viewed from the rear end of the trainer fuselage and stub shaft 200 will move toward the left side of the fuselage. Lever 198 will be made to pivot in this instance about the point 197 and the upper end of this lever as well as horizontal arm 204, link 208 and the rear end of arm 218 will move toward the left side of the trainer fuselage. A clockwise rotation of the upper rotatable half 158 of the rudder valve will result, increased vacuum will be applied to the left side of the turning motor while atmosphere is applied to the right side and therefore the trainer fuselage will turn about its vertical axis toward the left, i. e., in the direction of the bank.

A banking of the fuselage toward the right will cause the immediately aforedescribed elements to move in their respective opposite directions, a counterclockwise rotation of the upper half of the rudder valve will result, increased vacuum will be applied to the right side of the turning motor, atmosphere will be applied to the left side and a rotation of the trainer fuselage toward the right will occur, again in the direction of the bank.

The rate of turning of the trainer fuselage depends upon the amount of rotation of the upper half 158 of the rudder valve, and, therefore, is proportional to the degree of bank of the fuselage. Such a response exactly simulates the reaction of a plane under corresponding circumstances. Furthermore, this turning of the fuselage may be counteracted by an application of opposite rudder or opposite aileron, just as in a real plane.

With the foregoing means, therefore, the trainer fuselage will be automatically turned toward the left whenever it is banked in that direction and when it is banked to the right a turning toward the right will result in exact simulation of the response of a plane in actual flight to corresponding banking movements.

*Automatic nosing down of the trainer fuselage with a turning thereof*

In a plane in actual flight if a turn be made in either direction, the plane will "nose down," i. e., dive. This response of the plane is referred to as "nose down with turn." The following means are incorporated in this invention in order that the trainer fuselage will respond in exact simulation of this phase of actual flight.

Referring to Fig. 3, it will be seen that the lower half 142 of the rudder valve has a port 248 which is in communication by means of connection 250 with the outlet 98 of the port 96 of the elevator valve. Outlet 98 connects with the front elevator bellows 18. It will also be seen that a counterbore 252 is present in the lower half of the rudder valve, this counterbore extending a substantial distance into the face thereof and being in communication with port 254 which in turn is in communication by means of connection 256 with the exterior outlet 104 of port 102 of the elevator valve. Outlet 104 connects with rear elevator bellows 19. In effect, therefore, port 248 is in communication with front elevator bellows 18 while port 254 is in communication with rear elevator bellows 19.

In the upper rotatable half 158 of the rudder valve there are provided a pair of ports 258 and 260 which are in communication with central vacuum port 160 by means of interior ducts as shown. Two other ports 262 and 264 extend completely through section 158 and therefore are at all times filled with atmosphere.

Whenever upper rotatable valve section 158 is centrally positioned in working relation with the lower half 142 of the rudder valve, it will be seen that port 248 which is in communication with front elevator bellows 18 lies between vacuum-filled ports 258 and 260 while port 254 and counterbore 252 which are in communication with rear elevator bellows 19 lie between atmospheric ports 262 and 264. A rotation of upper valve section 158 in either direction will therefore bring port 248 into communication with one of the vacuum-filled ports 258 or 260 and consequently, reduced air pressure will be applied through connections 250 and 100 to front elevator bellows 18. At the same time, counterbore 252 and port 254 will be brought into communication with one of the atmospheric ports 262 or 264 and atmosphere will be applied to rear elevator bellows 19 through connections 256 and 106. The resultant contraction of the forward bellows 18 and expansion of the rearward bellows 19 will cause the trainer to "nose down." Regardless of the direction of the rotation of upper rotatable valve section 158, therefore, a "nosing down" of the trainer fuselage results.

As was explained in the section entitled Turning Action, the trainer fuselage turns only when the upper rotatable valve section 158 is rotated in one direction or the other. Inasmuch as whenever such rotation occurs a "nosing down" also is present, it will be realized that whenever the trainer is turning, "nose down" will be present, just as in the case of a real plane in flight.

*Increased rate of turn or "turn tightening" as a result of elevator movement in a banked turn*

As described in the preceding section, when a turn is made in actual aircraft the nose of the plane will drop proportionally to the degree of turn. Means were there disclosed for producing the same effect in the trainer. In order to overcome such a "nosing down" the pilot in a real plane applies back pressure to the control column, i. e., he pulls it toward him and the resulting elevator movement maintains the ship in horizontal flight. However, in the event that the plane is banked as it is turned, which is the normal procedure in actual flight, the pulling back of the control column and resulting elevator movement cause the plane to increase its rate of turn. This occurs because the elevators are not in their normal horizontal position, and, therefore, have to a certain extent, dependent upon the degree of bank, the effect of a rudder. This effect is familiarly known as "turn tightening." The following means are incorporated in the present invention in order that "turn tightening" may be simulated in the trainer.

Referring to Fig. 3, it will be seen that the lower section 92 of the elevator valve has a port 266 which is in communication by means of duct 268 with the central port 270 of the lower half 272 of the "turn tightening" valve. Another port 274 in the lower half 92 of the elevator valve is in communication by means of duct 276 with the port 278 of the turn tightening valve. In the upper half 108 of the elevator valve there is a port 280 which is in communication with vacuum-filled port 112 by means of interior duct 282. When upper rotatable half 108 is mounted upon lower half 92 of the elevator valve it will be seen in Fig. 3 that vacuum-filled port 280 lies adjacent port 266 which is in communication with the central port 270 of the lower part 272 of the turn tightening valve. Referring to Fig. 2, it will be seen that the application of back pressure, i. e., the pulling toward the student of the wheel 76 and control column 122 will cause link 130 to move toward the rear and the upper half 108 of the elevator valve will be turned counterclockwise. Vacuum-filled port 280 will therefore be in communication with port 266 and vacuum will be admitted to central port 270 of the lower half of the turn tightening valve 272. At the same time, atmospheric port 120 of the upper half 108 of the elevator valve will communicate with port 274 and atmosphere will be admitted through duct 276 to the port 278 of the lower half of the turn tightening valve. Therefore, whenever the control column is pulled toward the student, vacuum will be admitted to the port 270 and atmosphere will be admitted to the port 278 in the lower half 272 of the turn tightening valve.

In the lower half 272 of the turn tightening valve there is a port 284 which is in communication by means of connection 286 with the exterior outlet 148 and tube 150 which leads to the left side of the turning motor 30. Another port 288 by means of connection 290 is in communication with the exterior outlet 154 and tube 156 which leads to the right side of the turning motor 30. Therefore, in effect port 284 is in communication with the left side of the turning motor and port 288 is in communication with the right side thereof.

Reference is now made to the upper rotatable half of the turn tightening valve which in Fig. 3 is designated by the numeral 292. Central port 294 is surrounded by stem 296 which fits exactly inside port 270 of the lower half 272 of the turn tightening valve. Four other ports 298, 300, 302, and 304 are provided. None of the ports in the upper rotatable half 292 of the turn tightening valve extend completely therethrough. However, port 298 is in communication with port 300 by means of duct 306 and with port 302 by means of duct 308. Central port 294 is in communication with port 304 by means of interior duct 310.

When the upper rotatable section 292 of the turn tightening valve is mounted upon the lower half 272 in the neutral position, it will be seen that port 304 lies between ports 284 and 288 and does not overlap either of them. Port 300 lies adjacent port 284 and port 302 is likewise positioned relative to port 288. Port 298 is in engagement with port 278, and therefore, ports 300 and 302 also are in engagement with port 278.

When the upper rotatable half 108 of the elevator valve is turned counterclockwise in response to a backward movement of the control wheel 76, as stated before vacuum will be present in port 270 and atmosphere in port 278. Therefore, atmosphere will be present in ports 300 and 302 of the upper rotatable valve section and vacuum will be present in port 304 of that same section. Therefore, a clockwise movement of the upper rotatable half 292 of the turn tightening valve will cause vacuum-filled port 304 to come into engagement with port 284 which is in communication with the left side of the turning motor 30 and vacuum will be admitted to that side. At the same time, atmosphere filled port 302 will communicate with port 288 which is in communication with the right side of the turning motor 30 and atmosphere will be admitted to that side. As has been previously explained, the admission of vacuum to the left side of the turning motor and of atmosphere to the right side will cause the trainer fuselage to turn to the left.

On the other hand, if section 292 be turned in a counterclockwise direction, vacuum will be admitted from port 304 through port 288 to the right side of the turning motor and atmosphere will be admitted from port 300 through port 284 to the left side of the turning motor and the trainer fuselage will be made to turn toward the right.

Referring to Fig. 2, it will be seen that rigidly affixed to longitudinal shaft 244 to which reference has been previously made is upstanding arm 312 to the upper end of which is pivotally attached link 314 and to the other end of this link is pivotally attached the upper end of bracket 316. This bracket is rigidly affixed to the top of the upper rotatable half 292 of the turn tightening valve.

It will be recalled that a banking of the trainer fuselage in either direction will cause shaft 244 to rotate and therefore, the upper end of arm 312 will reciprocate as will link 314. Specifically, a banking of the trainer fuselage 10 to the right will cause link 240 and the upper end of arm 312, link 314 and the end of bracket 316 to which this last link is connected to move to the right and the upper section 292 of the turn tightening valve will be turned in a counterclockwise direction. Vacuum-filled port 304 will therefore communicate with port 288 and reduced air pressure will be applied to the right side of the turning motor. At the same time, atmosphere will be applied from port 300 through port 284 to the left side of the turning motor. This application of vacuum and atmosphere from the turn tightening valve to the turning motor will cause the trainer to turn to the right at an increased rate.

On the other hand, it will be appreciated that a banking of the trainer fuselage to the left will cause upper half 292 of the turn tightening valve to rotate clockwise, atmosphere will be admitted from port 302 to port 288 and to the right side of the turning motor 30. Simultaneous therewith, vacuum will be applied from the port 304 through port 284 to the left side of the turning motor 30, and an increased rate of turning of the trainer fuselage to the left will result.

It should be borne in mind that in order to realize this increased turning of the trainer two conditions must be present: First, the control wheel must be pulled to the rear of its neutral position in order that the upper rotatable half 108 of the elevator valve will permit vacuum to pass from port 280 through port 266 and duct 268 to the port 270 of the turn tightening valve and atmosphere to pass from port 120 through port 274 and duct 276 to the port 278 of the turn tightening valve. and secondly, the trainer fuselage must be banked in order that the upper rotatable half 292 of the turn tightening valve will be moved from its neutral position, thereby permitting atmosphere to flow from port 300 or 302 to port 284 or 288 respectively, and vacuum to flow from port 304 to port 284 or 288, thereby admitting atmosphere to one side of the turning motor 30 and reduced air pressure to the other side of the turning motor.

Furthermore, it should be noticed that when the trainer is banked to the left, the upper rotatable half 292 of the turn tightening valve is positioned so that vacuum is admitted to the left side of the turning motor and atmosphere to the right side, thereby increasing the speed of rotation to the left, but if the trainer be banked to the right, the turn tightening valve will be positioned so that an increased rate of turning to the right results.

It may be concluded therefore that if the trainer be in a banked turn a pulling to the rear of the control column will increase the rate of turn just as in a plane in actual flight. It will be readily realized that an application of opposite rudder will offset such turning.

Furthermore, if a plane be banked in flight and sufficient opposite rudder be applied to overcome the tendency of the plane to turn as a result of the bank, it will be realized that if the control column be pulled to the rear the elevators will nevertheless have the effect of the rudder because of the lateral banking position of the plane and the plane will be turned in the direction of the bank. The preceding explanation makes it clear that this invention will duplicate this feature of actual flight because whenever the control column be back and the trainer be banked the trainer turns in the direction of the bank.

*Interaction of bank with turn, turn with bank, and turn tightening*

In an airplane in actual flight if a certain amount of turning of the control wheel or sidewise movement of the control stick be made, no other control in the plane being moved from its neutral position, the action of the ailerons will cause the plane to bank, the resultant bank will cause the plane to turn, the turning will then cause the nose of the plane to drop as well as cause additional bank which then produces more turning and a greater amount of nose drop, the result being an increasingly tight spiraling of the plane toward the earth.

The previously-disclosed mechanism of this invention simulates such a response of a plane in actual flight to a given setting of the ailerons. For example, if the control wheel 76 be turned a given amount to the left, i. e., counterclockwise as viewed by the student in the trainer, the upper rotatable half 62 of the aileron valve will be turned clockwise, vacuum will be admitted to the left aileron bellows 20 and atmosphere to the right aileron bellows 21 and the trainer will bank to the left at a certain rate, the longer the elapsed time the greater will become the bank. As the trainer starts to bank, link 240 will push the upper end of arm 242 to the left, shaft 244 will be rotated, stub shaft 200 will be moved to the left as will the upper end of lever 198 which will pivot at the point 197, arm 204 and both of the links 208 and 222 will likewise move to the left. This movement of link 208 will rotate the upper half 158 of the rudder valve clockwise, vacuum will be admitted to the left side of the turning motor 30 and atmosphere to the right and a rotation of the trainer toward the left will take place. This same rotation of upper valve section 158 will cause vacuum from port 258 to enter port 248 and by means of connection 250 will be applied to the front elevator bellows 18. At the same time, atmosphere will be applied through port 262 in the upper half 158 of the rudder valve through port 254 and connection 256 to the rear elevator bellows 19. This application of vacuum to the front and atmosphere to the rear elevator bellows will cause the nose of the trainer fuselage to drop.

At the same time, the movement of arm 204 to the left which, as stated in the preceding paragraph, is caused by the banking of the trainer fuselage, moves link 222 and the upper end of arm 232 in the same direction, shaft 234 will be rotated counterclockwise as viewed from the rear of the trainer, the lower end of block 236 and stub shaft 238 will move toward the right as will the upper end of lever 86, which lever in this instance pivots at the point 85, thereby pulling link 90 farther to the right and rotating upper aileron valve section 62 to a more advanced clockwise position. This in turn will cause an accelerated banking of the trainer fuselage which in turn will force link 240, links 208 and 222 still farther to the left, thereby rotating the upper half of the rudder valve 158 to a more advanced clockwise position producing an accelerated rate of turn and a greater nose heaviness, also rotating upper valve section 62 to an even greater extent clockwise which will cause the trainer fuselage to bank increasingly faster, the additional increased bank produces increased turn which then produces increased nose heaviness and eventually the trainer fuselage will be rotating at great speed wtih its nose and left wing in their downmost positions.

If the wheel 76 were turned toward the right, that is, clockwise as viewed by the student in the trainer, the same result would occur except that the right wing would be in its downmost position and the rotation of the fuselage would be toward the right.

Again, in a plane in actual flight, if one of the rudder pedals be placed in a certain position, no other control in the plane being affected, the plane will start to turn, a nose heaviness and a banking of the fuselage result, the resultant banking will then cause a greater rate of turn which then causes more bank and nose heaviness. As time elapses, a tighter spiraling of the plane toward the earth occurs. This response of an airplane may also be simulated in the trainer by means of the previously-disclosed mechanism.

If left rudder pedal 174 be pushed forward to a certain position and there maintained, links 184, 188, and the left end of arm 190 will move to the rear. The rear end of arm 194, link 196 and the lower end of lever 198 will move toward the right. The upper end of lever 198, arm 204 and links 208 and 222 will therefore move toward the left. Upper rotatable section 158 of the rudder valve will be turned clockwise, the trainer will begin to rotate to the left and a "nose heaviness" will occur simultaneous therewith. The movement of link 222 toward the left will, through the action of arm 232, shaft 234, block 236, stub shaft 238, lever 88 and link 90, turn upper section 62 of the aileron valve clockwise and the trainer will bank to the left at a certain rate. We then have the same forces in action as immediately above when the effect of maintaining wheel 76 in a given position from the neutral was disclosed. The banking to the left of the trainer caused by the position of section 62 of the aileron valve will cause link 240 and intermediate linkage to cause links 208 and 222 to further rotate the upper section of the rudder valve as well as the upper section of the aileron valve. Increased turning, increased nose heaviness and increased banking result until the point is reached where the trainer fuselage with its left wing and nose in their lowermost positions is rotating at a fast rate.

If the right rudder pedal 172 were the one upon which the student placed his foot and it were maintained in that position, the same response of the trainer fuselage would result except that the rotation would be toward the right and the right wing would be in its lowermost position.

As explained in the section on Turn tightening, whenever the control stick in a plane which is in a banked turn is pulled back the rate of the turn is increased, i. e., a "tightening" of the turn results. If the trainer be in a banked turn, it was also described in that section that a pulling backward of the control column in the trainer will cause an increased rate of turning of the trainer.

A plane in actual flight in a banked, descending turn may be made to assume forward flight either by centralizing the controls or by applying control opposite to that which cause it to assume its spiraling position. When the trainer is in its simulated spiraling position it also may be made to assume simulated forward flight by a centralizing of the controls or by an application of the opposite control or controls to that which caused such a condition. Assuming that the rotation, nose and wing down of the trainer was caused by the turning of the control wheel 76 to the left, a centralization of this wheel will cause the upper rotatable section 62 of the aileron valve to move counterclockwise to the same extent as it was moved clockwise by a rotation of the control wheel 76 in the opposite direction. Less vacuum will therefore be applied to left aileron bellows 20 and less atmosphere to right aileron bellows 21. The leakage of air through the covering bellows 20 will cause it to expand and the left side of the trainer fuselage will be raised a certain extent. This raising of the trainer fuselage will cause link 240 to move toward the right as will stub shaft 200, the upper end of lever 198 and links 208 and 222. The upper section 158 of the rudder valve will therefore be turned counterclockwise, less vacuum and less air will be applied to the turning motor 30 and the rotation of the trainer fuselage will be diminished. At the same time, less nose heaviness of the trainer will result. The movement of link 222 toward the right will cause the upper end of arm 232 to move in the same direction while stub shaft 238 will be moved toward the left and the upper section 62 of the aileron valve will be moved counterclockwise. Less vacuum will then be applied to bellows 20 and an even greater raising of the left side of the trainer fuselage will result. This process will continue until the rotation of the trainer fuselage, the nose heaviness and the banking have all disappeared and the trainer has again assumed simulated level flight. Of course, if instead of merely neutralizing the controls, controls opposite to that which caused such condition were actually applied, the trainer would assume simulated level flight in a shorter length of time.

If the spiraling of the trainer were caused by the positioning of the rudder valve by the application of one of the rudder pedals, a neutralizing of the pedals will likewise cause the trainer to assume simulated level flight.

The foregoing being a preferred embodiment of this invention, we do not limit ourselves other than by any prior art and the following claims:

1. The combination of a grounded aviation trainer comprising a fuselage, means within said trainer for turning said fuselage about its vertical axis and means within said trainer for laterally banking said fuselage in simulation of the turning and banking of a plane in actual flight, a control column in said fuselage, and means for actuating said turning means, said actuating means being responsive to the lateral banking position of said fuselage as well as to the position of said control column so as to actuate said turning means to turn said fuselage whenever said fuselage is banked and said control column is behind its neutral position.

2. The combination of a grounded aviation trainer comprising a fuselage, means within said trainer for turning said fuselage about its vertical axis and means within said trainer for laterally banking said fuselage in simulation of the turning and banking of a plane in actual flight, a control column in said fuselage, and means for actuating said turning means, said actuating means being responsive to the lateral banking position of said fuselage as well as to the position of said control column so as to actuate said turning means to turn said fuselage whenever said fuselage is banked and said control column is behind its neutral position, said turning being in the direction of said bank.

3. The combination of a grounded aviation trainer comprising a fuselage, means within said trainer for turning said fuselage about its vertical axis and means within said trainer for laterally banking said fuselage in simulation of the turning and banking of a plane in actual flight, a control column and a pair of rudder pedals in said fuselage, and means for actuating said turning means, said actuating means being responsive to the lateral banking position of said fuselage as well as to the position of said control column so as to actuate said turning means to turn said fuselage whenever said fuselage is banked and said control column is behind its neutral position, said turning being in the direction of said bank, and means for offsetting the rotation of said fuselage caused by the combined position of said control column and the lateral banking position of said fuselage by a movement of the rudder pedal on the side of the fuselage opposite the direction of said turning.

4. The combination of a grounded aviation trainer comprising a fuselage, means within said trainer for turning said fuselage about its vertical axis and means within said trainer for laterally banking said fuselage in simulation of the turning and banking of a plane in actual flight, a control column and a controlling element in said fuselage, said turning means being responsive to the position of said controlling element, said controlling element in turn being responsive to the lateral banking position of said fuselage as well as to the position of said control column so as to cause said turning means to turn said fuselage whenever said fuselage is banked and said control column is behind its neutral position.

5. The combination of a grounded aviation trainer comprising a fuselage, means within said trainer for turning said fuselage about its vertical axis and means within said trainer for laterally banking said fuselage in simulation of the turning and banking of a plane in actual flight, a control column and a controlling element in said fuselage, said turning means being responsive to the position of said controlling element, said controlling element in turn being responsive to the lateral banking position of said fuselage as well as to the position of said control column so as to cause said turning means to turn said fuselage whenever said fuselage is banked and said control column is behind its neutral position, said turning being in the direction of said bank.

6. The combination of a grounded aviation trainer comprising a fuselage, means within said trainer for turning said fuselage about its vertical axis and means within said trainer for laterally banking said fuselage in simulation of the turning and banking of a plane in actual flight, a pair of rudder pedals, a control column and a controlling element in said fuselage, said turning means being responsive to the position of said controlling element, said controlling element being responsive to the lateral banking position of said fuselage as well as to the position of said control column so as to cause said turning means to turn said fuselage whenever said fuselage is banked and said control column is behind its neutral position, said turning being in the direction of said bank, and means for offsetting the rotation of said fuselage caused by the position of said controlling element by a movement of the rudder pedal on the side of the fuselage opposite the direction of said turning.

7. The combination of a grounded aviation trainer comprising a fuselage, fluid means within said trainer for turning said fuselage about its vertical axis and means within said trainer for laterally banking said fuselage in simulation of the turning and banking of a plane in actual flight, a control column and a controlling element in said fuselage, said controlling element comprising two valves, one of said valves being responsive to the position of said control column and the other being responsive to the lateral banking position of said fuselage, said valves actuating said fluid turning means to turn said fuselage about its vertical axis whenever said fuselage is banked and said control column is behind its neutral position.

8. In a grounded aviation trainer the combination of a fuselage, means within said trainer for turning said fuselage about its vertical axis and trainer for turning said fuselage about its vertical axis and means within said trainer for laterally banking said fuselage in simulation of the turning and banking of a plane in actual flight, a pair of rudder pedals and a control column in said fuselage, means for actuating said turning means to turn said fuselage in response to the positions of said rudder pedals, means for automatically banking said fuselage whenever said actuating means is causing said turning means to turn said fuselage in response to the positions of said rudder pedals, and additional means for actuating said turning means to increase the rate of turning caused by the positions of said rudder pedals whenever said fuselage is banked and said control column is behind its neutral position.

ance with the positions of said rudder pedals, means for causing said fuselage to bank whenever said fuselage is turning, said banking being in the direction of said turning, and a second controlling element responsive to the lateral banking position of said fuselage as well as to the position of said control column, said second controlling element actuating said turning means to increase the rate of rotation caused by the positioning of said first-mentioned controlling element whenever said fuselage is banked in the direction of the turning and said control column is behind its neutral position.

17. The combination of a grounded aviation trainer comprising a fuselage, fluid means within said trainer for turning said fuselage about its vertical axis and means within said trainer for laterally banking said fuselage in simulation of the turning and banking of a plane in actual flight, a pair of rudder pedals and a control column in said fuselage, said turning means turning said fuselage about its vertical axis in accordance with the position of a controlling element, said controlling element being responsive to the lateral banking position of said fuselage as well as to the positions of said rudder pedals, and a second controlling element for further controlling the rotation of said fuselage about its vertical axis, said second controlling element comprising two valves, one of said valves being responsive to the lateral banking position of said fuselage and the other responsive to the position of said control column, the rate of rotation of said fuselage caused by the position of said first-mentioned controlling element being increased by the position of said second controlling element whenever said fuselage is laterally banked in the direction of the turn and said control column is placed behind its neutral position.

18. The combination of a grounded aviation trainer comprising a fuselage, means within said trainer for causing said fuselage to bank, means within said trainer for causing said fuselage to dive and means within said trainer for turning said fuselage about its vertical axis in simulation of the banking, diving and turning of a plane in actual flight, a control column and a pair of rudder pedals in said fuselage, means for causing said fuselage to turn according to the positions of said rudder pedals and means for causing said fuselage to dive whenever said fuselage is turning in response to the positions of said rudder pedals, and additional means for causing said fuselage to turn whenever said fuselage is banked and said control column is behind its neutral position.

19. The combination of a grounded aviation trainer comprising a fuselage, means within said trainer for causing said fuselage to bank, means within said trainer for causing said fuselage to dive and means for causing said fuselage to turn in simulation of the diving, banking and turning of a plane in actual flight, means for causing said fuselage to turn according to the positions of said rudder pedals as well as the lateral banking position of said fuselage, means for causing said fuselage to dive whenever said fuselage is turning as a result of the positions of said rudder pedals and the lateral banking position of said fuselage, and additional means for causing said fuselage to turn whenever said fuselage is banked and said control column is placed behind its neutral position.

20. The combination of a grounded aviation trainer comprising a fuselage, means within said trainer comprising a two leaf valve for banking said fuselage and means within said trainer for turning said fuselage about its vertical axis in simulation of the banking and turning of a plane in actual flight, said banking means causing said fuselage to bank according to the relative positions of the leaves of said valve, a pair of rudder pedals in said fuselage, the relative positions of said leaves being responsive to the positions of said rudder pedals so as to cause said fuselage to bank in response to the positions of said rudder pedals.

21. The combination of a grounded aviation trainer comprising a fuselage, means within said trainer for turning said fuselage about its vertical axis and means within said trainer comprising a two leaf valve for banking said fuselage in simulation of the turning and banking of a plane in actual flight, said banking means causing said fuselage to bank according to the relative positions of the leaves of said valve, a pair of rudder pedals and a control wheel in said fuselage, the position of one of the leaves of said valve being differentially responsive to the combined positions of said control wheel and said rudder pedals.

22. The combination of a grounded aviation trainer comprising a fuselage, means within said trainer for turning said fuselage about its vertical axis and means within said trainer comprising a valve having at least two parts for banking said fuselage, in simulation of the turning and banking of a plane in actual flight, said banking means causing said fuselage to bank according to the relative positions of the parts of said valve, a pair of rudder pedals and a control wheel in said fuselage, the position of one of the parts of said valve being differentially responsive to the combined positions of said control wheel and said rudder pedals.

23. The combination of a grounded aviation trainer comprising a fuselage, means within said trainer comprising a two leaf valve for banking said fuselage in simulation of the banking of a plane in actual flight, said banking means banking said fuselage in accordance with the relative positions of the leaves of said valve, the relative positions of the leaves of said valve being responsive to the lateral banking position of said fuselage.

24. The combination of a grounded aviation trainer comprising a fuselage, means within said trainer comprising a valve having at least two parts for banking said fuselage in simulation of the banking of a plane in actual flight, said banking means banking said fuselage in accordance with the relative positions of the parts of said valve, the relative positions of the parts of said valve being responsive to the lateral banking position of said fuselage.

25. The combination of a grounded aviation trainer comprising a fuselage, means within said trainer comprising a two leaf valve for banking said fuselage in simulation of the banking of a plane in actual flight, said banking means banking said fuselage in accordance with the relative positions of the leaves of said valve, a control wheel in said fuselage, the relative positions of the leaves of said valve being responsive to the lateral banking position of said fuselage as well as to the position of said control wheel.

26. The combination of a grounded aviation trainer comprising a fuselage, means within said trainer comprising a two leaf valve for banking said fuselage in simulation of the banking of a plane in actual flight, said banking means banking said fuselage in accordance with the relative positions of the leaves of said valve, a control wheel and a pair of rudder pedals in said fuselage, the relative positions of the leaves of said valve being responsive to the lateral banking position of said fuselage, the position of said control wheel as well as the positions of said rudder pedals so as to bank said fuselage in accordance with the lateral banking position of said fuselage, the position of said control wheel, and the positions of said rudder pedals.

27. The combination of a grounded aviation trainer comprising a fuselage, means within said trainer for banking said fuselage in simulation of the banking of a plane in actual flight, a first means within said fuselage for actuating said banking means and additional means for actuating said banking means by the banking of said fuselage caused by said first banking means.

28. The combination of a grounded aviation trainer comprising a fuselage, means within said trainer for banking said fuselage in simulation of the banking of a plane in actual flight, a control column in said fuselage, means for actuating said banking means by the movements of said control column, and additional means for actuating said banking means by the banking of said fuselage caused by said control column movements.

29. The combination of a grounded aviation trainer comprising a fuselage, means within said trainer for banking said fuselage in simulation of the banking of a plane in actual flight, a pair of rudder pedals in said fuselage, means for actuating said banking means by the movements of said rudder pedals, and additional means for actuating said banking means by the banking of said fuselage caused by said rudder pedal movements.

30. The combination of a grounded aviation trainer comprising a fuselage, means within said trainer for banking said fuselage in simulation of the banking of a plane in actual flight, a control column and a pair of rudder pedals in said fuselage, means for actuating said banking means by the movements of said control column and by the movements of said rudder pedals, and additional means for actuating said banking means by the banking of said fuselage caused by said control column and said rudder pedal movements.

31. In a grounded aviation trainer comprising a fuselage, the combination of means within said trainer for banking said fuselage, means within said trainer for turning said fuselage, a control column and a pair of rudder pedals within said fuselage, means within said trainer for causing said fuselage to turn and bank in response to the movements of said rudder pedals and in response to the movements of said control column, and means for causing said fuselage to further bank in response to the banking of said fuselage caused by said rudder pedal and control column movements.

32. In a grounded aviation trainer comprising a fuselage, the combination of means within said trainer for banking said fuselage, means within said trainer for turning said fuselage, a control column and a pair of rudder pedals within said fuselage, means within said trainer for causing said fuselage to turn and bank in response to the movements of said rudder pedals and in response to the movements of said control column, and additional means for causing said fuselage to turn in response to the banking of said fuselage.

33. In a grounded aviation trainer comprising a fuselage, the combination of means within said trainer for banking said fuselage, means within said trainer for turning said fuselage, a control column and a pair of rudder pedals within said fuselage, means within said trainer for causing said fuselage to turn and bank in response to the movements of said rudder pedals and in response to the movements of said control column, and means for causing said fuselage to further bank and turn in response to the banking of said fuselage caused by said rudder pedal and control column movements.

EDWIN A. LINK.
KARL A. KAIL.